US006681494B1

(12) United States Patent
Bowden

(10) Patent No.: US 6,681,494 B1
(45) Date of Patent: Jan. 27, 2004

(54) BUBBLE LEVEL

(75) Inventor: Wes Bowden, Emporia, KS (US)

(73) Assignee: Pedestal Corporation, Emporia, KS (US)

( * ) Notice: Subject to any disclaimer, the term of this patent is extended or adjusted under 35 U.S.C. 154(b) by 0 days.

(21) Appl. No.: 10/184,762

(22) Filed: Jun. 27, 2002

(51) Int. Cl.$^7$ .............................................. G01C 9/24
(52) U.S. Cl. .......................................... 33/379; 33/389
(58) Field of Search ............................ 33/379, 380, 381, 33/382, 383, 384, 385, 386, 387, 388, 389, 390

(56) References Cited

U.S. PATENT DOCUMENTS

| | | | | |
|---|---|---|---|---|
| 456,086 A | * | 7/1891 | Forwood | 33/390 |
| 2,305,678 A | * | 12/1942 | Cravaritis et al. | 33/348 |
| 2,750,677 A | | 6/1956 | Wirth | |
| 3,793,735 A | * | 2/1974 | Humphrey | 33/348 |
| 4,164,077 A | | 8/1979 | Thomas | |
| 4,610,094 A | | 9/1986 | Robson et al. | |
| 4,912,854 A | * | 4/1990 | Weadon | 33/348.2 |
| 5,187,871 A | * | 2/1993 | McDermott | 33/354 |
| 6,029,360 A | | 2/2000 | Koch | |
| 2002/0162236 A1 | * | 11/2002 | Roth et al. | 33/379 |

FOREIGN PATENT DOCUMENTS

WO  0063644  10/2000

* cited by examiner

Primary Examiner—Christopher W. Fulton
Assistant Examiner—Amy R. Cohen
(74) Attorney, Agent, or Firm—Hovey Williams LLP

(57) ABSTRACT

A bubble level (10) comprises a base (12) and a vial (14). The vial (14) includes two inwardly sloped outwardly bowed interior side-walls (44) and a top exterior surface (36). The interior side-walls (44) are aligned at an approximately forty-five degree angle to the top exterior surface (36) and meet slightly below the top exterior surface (36) at an approximately ninety degree angle. When a longitudinal axis of the level (10) is horizontal, a bubble (52) is centered with respect to graduations (38) and thereby indicates that the level (10) is level. This is true without regard to how the level (10) is rotated about the longitudinal axis. For example, when the level (10) is rotated so that the top exterior surface (36) is aligned downwardly, the bubble (52) is centered due to the effect of surface tension acting upon the bubble (52) and against the interior side-walls (44).

22 Claims, 2 Drawing Sheets

BUBBLE LEVEL

BACKGROUND OF THE INVENTION

1. Field of the Invention

The present invention relates to bubble levels. More particularly, the present invention relates to a bubble level with a bubble that can be seen from a distance and that can indicate when a longitudinal axis of the bubble level is substantially horizontal, regardless of how the bubble level is rotated about the longitudinal axis.

2. Description of Prior Art

Bubble levels are widely used to help people ensure items are substantially level or upright. For example, people commonly use bubble levels to properly align and level pictures being hung on walls and studs used to form walls in houses and other buildings.

Additionally, when building structures, people often use bubble levels to check that individual components of such structures are horizontal. For example, when building a deck, people often use bubble levels to ensure that cross members are horizontal so that the deck will be level.

Commonly available bubble levels use a cylindrical tube partially filled with liquid. Such tubes are typically slightly bent in order to force a high point within the tube. A bubble in the liquid indicates when these bubble levels are substantially horizontal, by seeking the high point.

These bubble levels work well, but only when they are used with a top side oriented upwardly. If these bubble levels are flipped upside down, so that the top side is oriented downwardly, they no longer function properly. This is due to the fact that what should be the high point is now a low point.

Additionally, if these bubble levels are rotated approximately ninety degrees, so that the top surface is oriented to one side, they no longer function properly. This is due to the fact that there is no longer a high point within the tube.

In order to overcome these limitations, manufacturers are forced to install several of these tubes into each bubble level. However, more tubes increases manufacturing costs making such bubble levels more expensive. Additionally, more tubes increases the complexity of such bubble levels by requiring a user to decide which tube he or she should observe. Furthermore, more tubes increases the size and weight of such bubble levels.

An additional limitation of commonly used bubble levels is an inability to see them from a distance. Bubbles in these bubble levels are typically not able to reflect or direct light toward a user and thus are not visible unless the user is very close by.

Accordingly, there is a need for an improved bubble level that overcomes the limitations of the prior art.

SUMMARY OF THE INVENTION

The present invention overcomes the above-identified problems and provides a distinct advance in the art of bubble levels. More particularly, the present invention provides a bubble level with a bubble that can be seen from a distance and that can indicate when a longitudinal axis of the bubble level is substantially horizontal, regardless of how the bubble level is rotated about the longitudinal axis. The bubble level broadly comprises a base and a vial. The base includes two arcuate ends, two slightly outwardly bowed sides, and a substantially flat top surface.

The vial includes two substantially flat exterior ends, two slightly outwardly bowed exterior sides, and a substantially flat top exterior surface. The top exterior surface of the vial preferably includes graduations which are substantially centered with respect to the top exterior surface. The graduations preferably include indicia of a midpoint of the graduations.

In addition, the vial includes two inwardly sloped substantially flat triangularly shaped interior end-walls and two inwardly sloped outwardly bowed interior side-walls. The interior side-walls are aligned at an approximately forty-five degree angle to the exterior sides and the top exterior surface of the vial. Additionally, the interior side-walls meet slightly below the top exterior surface at an approximately ninety degree angle to form an arcuate apex along the longitudinal axis of the vial. The apex is closest to the top exterior surface of the vial near a middle of the top exterior surface. The apex curves slightly away from the top exterior surface as it nears the two interior end-walls of the vial. The middle of the vial is preferably aligned with the midpoint of the graduations.

During manufacturing, a liquid is injected between the base and the vial through a hole in the base in sufficient quantity so as to form the bubble. The bubble is preferably large enough so as to not be able to form a true spherical shape at any point between the base and the vial.

Light incident upon either of the interior side-walls where the bubble is present meets an air interface at the approximately forty-five degree angle of the interior side-wall. The air interface causes the light to reflect at an approximately ninety degree angle. Therefore, light entering the top exterior surface will be reflected off one of the interior side-walls adjacent the bubble and out one of the exterior sides of the vial. This is particularly useful in gathering and reflecting sunlight or other ambient light so that the bubble can be seen from a greater distance.

Additionally, when light is incident upon either one of the exterior sides or the top exterior surface of the vial, from within the vial, a portion of the light is reflected. Thus, when light enters one of the exterior sides of the vial and becomes incident upon one of the interior side-walls, it is reflected toward the top exterior surface of the vial. When the light is incident upon the top exterior surface, from within the vial, a portion of the light is reflected back toward the interior side-wall. The light is again reflected off the interior side-wall toward the exterior side of the vial.

These air interfaces allow a user to look into one of the exterior sides of the vial and align the bubble with the midpoint of the graduations on the top exterior surface of the vial. Thus, the user may view the position of the bubble with respect to the graduations, by looking at either of the exterior sides or the top exterior surface of the vial. Additionally, the user may view the bubble within the bubble level from a distance, since light can be gathered and reflected toward the user. For example, if one of the exterior sides is aligned upwardly, then light entering the exterior side may be reflected out the top exterior surface to the user who may be standing across a room from the bubble level.

When the longitudinal axis of the bubble level is substantially horizontal, the bubble will be substantially centered with respect to the graduations and thereby indicate that the bubble level is level. As will be discussed below, this is true without regard to how the bubble level is rotated about the longitudinal axis.

For example, when the bubble level is rotated so that the top exterior surface is aligned upwardly, the bubble is centered due to the fact that the middle of the apex is closest to the top exterior surface of the vial. Therefore, a highest point is directly under the midpoint of the graduations.

As another example, when the bubble level is rotated so that either one of the exterior sides is aligned upwardly, the bubble is centered due to the fact that the interior side-walls are bowed outwardly, as discussed above. Therefore, the highest point is where a middle of the interior side-wall meets the base. The middle of the interior side-wall is also aligned with the graduations, such that the bubble is centered adjacent the midpoint of the graduations.

As a final example, when the bubble level is rotated so that the top exterior surface is aligned downwardly, the bubble is centered due to the effect of surface tension acting upon the bubble and against the interior side-walls. Since the top surface of the base is substantially flat, there is no highest point on the top surface of the base. Additionally, since the middle of the apex is closest to the top exterior surface, the middle of the apex is now a lowest point in the vial. Therefore, the middle of the apex is farthest from the base and provides a maximum cross-sectional area between the base and the vial. The maximum cross-sectional area allows the bubble to most closely achieve the spherical shape, which is the shape the surface tension of the liquid inherently tries to achieve.

Therefore, by constricting the area between the base and the vial such that the bubble cannot achieve the spherical shape, the surface tension of the liquid will center the bubble with respect to the graduations. This is due to the fact that the bubble is able to most closely achieve the spherical shape only when the bubble is centered with respect to the middle of the apex, which is centered with respect to the midpoint of the graduations. Thus, the surface tension of the liquid causes the bubble to indicate that the bubble level is level, when there is no highest point for the bubble to seek.

The operation of the bubble level has been described as the bubble level is rotated about a substantially horizontal longitudinal axis, in approximately ninety degree increments. As should be apparent, when the bubble level is rotated to a point between one of the above described examples, a combination of the above principals will act to center the bubble. This, of course, is provided that the longitudinal axis of the bubble level is held substantially horizontal.

Alternatively, when the longitudinal axis of the bubble level is not substantially horizontal, the bubble will not be substantially centered with respect to the graduations. This is due to the fact that the highest point is located other than adjacent the midpoint of the graduations without regard to how the bubble level is rotated about the longitudinal axis. The degree to which the longitudinal axis is not horizontal can also be indicated by the bubble and the graduations.

In use, the user affixes the bubble level to the object to be leveled. Alternatively, the user may simply hold the bubble level against the object, or may place the bubble level on top of the object, letting gravity hold the bubble level in place. Then, the user looks into the vial from either of the exterior sides or the top exterior surface of the vial and moves the object to center the bubble with respect to the midpoint of the graduations. Regardless of whether the user looks into the vial from either of the exterior sides or the top exterior surface, the user can seen the graduations using the reflective properties of the vial, as described above.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
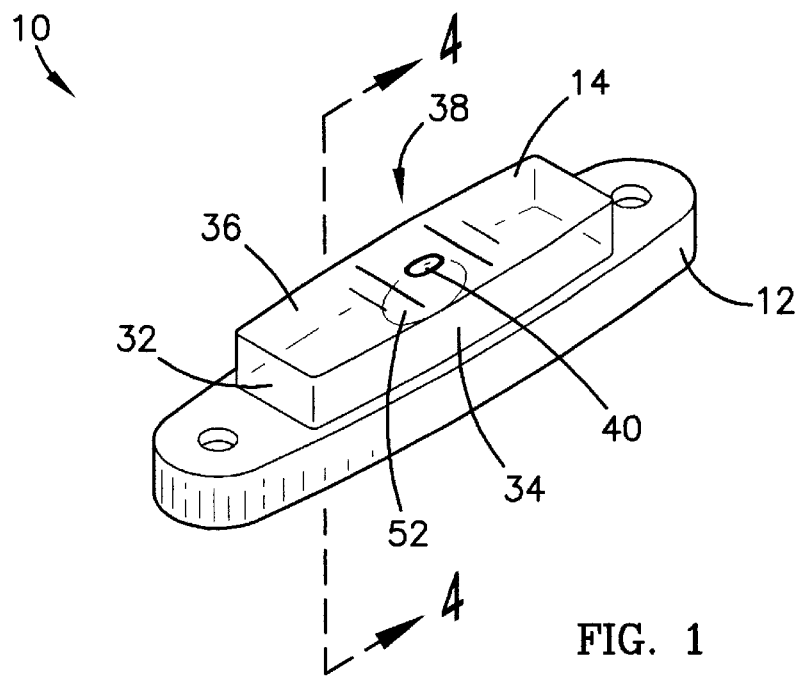
FIG. 1 is a perspective view of a bubble level constructed in accordance with the present invention with a longitudinal axis substantially horizontal.
Figure 2:
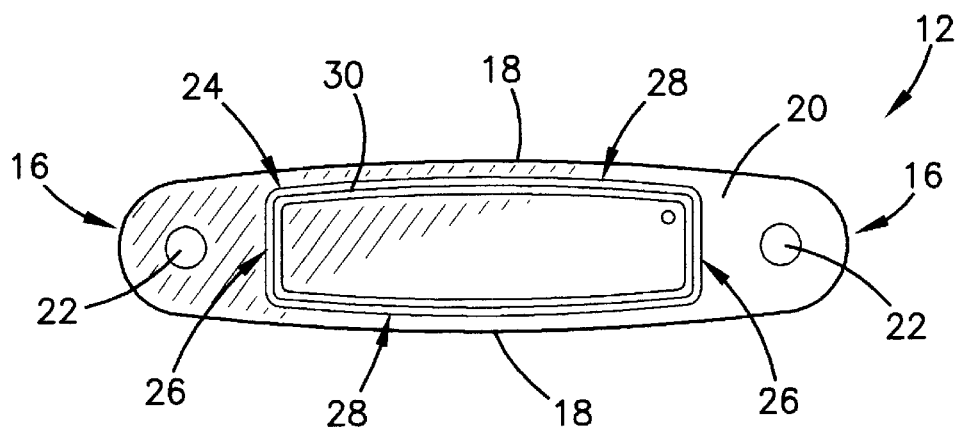
FIG. 2 is a top plan view of a base of the bubble level.

Referring to FIG. 1, the preferred bubble level 10 in accordance with the present invention broadly comprises a base 12 and a vial 14. Referring also to FIG. 2, the base 12 is preferably constructed of an opaque plastic and may be white, black, or any color. Alternatively, the base 12 may be substantially transparent. The base 12 is preferably oblong in shape with an approximately two and one quarter inch length, an approximately one half inch width, and an approximately three sixteenths of an inch height. The base 12 includes two arcuate ends 16, two slightly outwardly bowed sides 18, and a substantially flat top surface 20. The base 12 also includes two holes 22, with one of the holes 22 at each of the arcuate ends 16. A screw, nail, or other fastener may be driven through each of the holes 22, in order to secure the base 12 to an object to be leveled, such as a board, a wall, or a floor.

A channel 24 resides in the top surface 20 of the base 12. The channel 24 is preferably approximately one tenth of an inch wide and approximately one tenth of an inch deep. The channel 24 is preferably made up of two substantially straight short grooves 26 and two arcuate long grooves 28. Each of the short grooves 26 is oriented perpendicularly to a longitudinal axis of the base 12 and near one of the holes 22. Each of the long grooves 28 is oriented along the longitudinal axis of the base 12 and connects the short grooves 26, such that the channel 24 forms a continuous loop. Each of the long grooves 28 preferably closely follows an appropriate one of the bowed sides 18 of the base 12. Finally, a raised seal 30 is centered within the channel 24 in order to provide a liquid tight seal between the base 12 and the vial 14.

Figure 3:
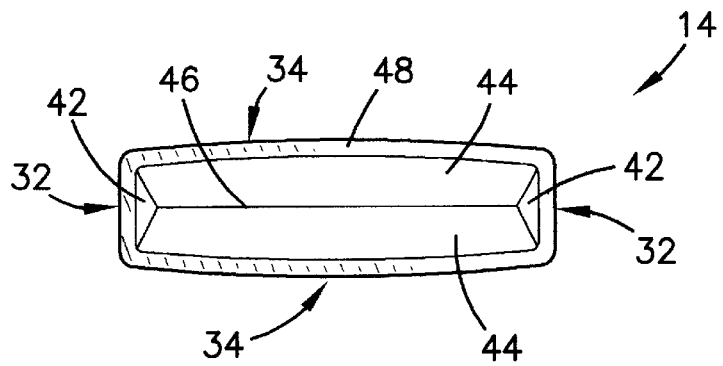
FIG. 3 is bottom plan view of a vial of the bubble level.

The vial 14 is preferably constructed of a substantially transparent acrylic, but may have a slight hue. The vial 14 is substantially rectangular in shape with an approximately one and three eighths inch length, an approximately seven sixteenths of an inch width, and an approximately one quarter inch height. Referring also to FIG. 3, the vial 14 includes two substantially flat exterior ends 32, two slightly outwardly bowed exterior sides 34, and a substantially flat top exterior surface 36. The top exterior surface 36 of the vial 14 preferably includes graduations 38 which are substantially centered with respect to the top exterior surface 36. The graduations 38 preferably include indicia of a midpoint 40 of the graduations 38.

Figure 4:
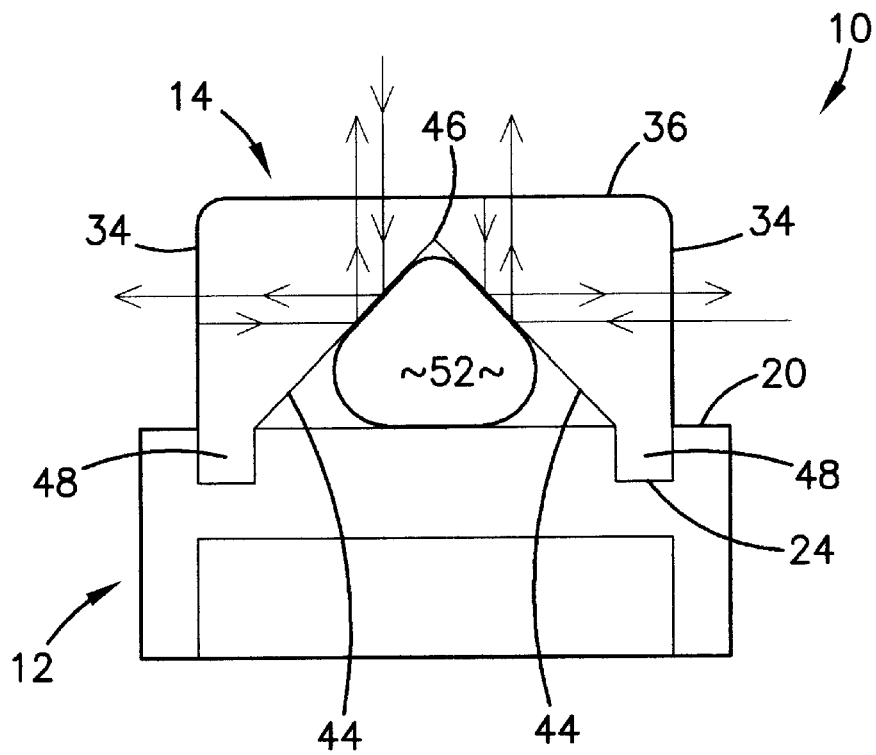
FIG. 4 is cross-sectional elevational view of the bubble level taken along line 4—4 of FIG. 1.

In addition, the vial 14 includes two inwardly sloped substantially flat triangularly shaped interior end-walls 42 and two inwardly sloped outwardly bowed interior side-walls 44. As shown in FIG. 4, the interior side-walls 44 are aligned at an approximately forty-five degree angle to the exterior sides 34 and the top exterior surface 36 of the vial 14. Additionally, the interior side-walls 44 meet slightly below the top exterior surface 36 at an approximately ninety degree angle to form an arcuate apex 46 along the longitudinal axis of the vial 14. The interior end-walls 42 and the interior side-walls 44 do no extend to a bottom of the vial 14, such that a protrusion 48 extends around the periphery of the vial 14. The protrusion 48 can thus be inserted in the channel 24 and against the raised seal 30 of the base 12 in order to form the liquid tight seal.

Figure 5:
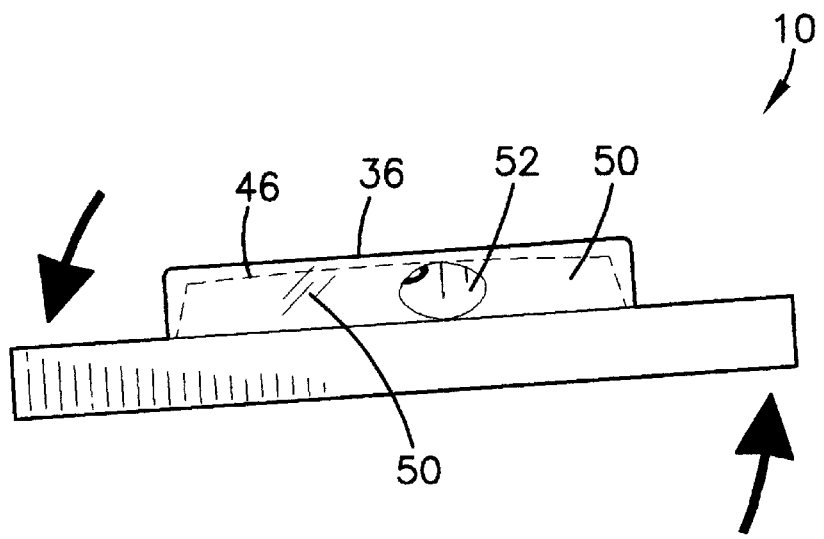
FIG. 5 is a side elevational view of the bubble level with the longitudinal axis slightly offset from the horizontal.

As shown in FIG. 5, the apex 46 is closest to the top exterior surface 36 of the vial 14 near a middle of the top exterior surface 36. The apex 46 curves slightly away from the top exterior surface 36 as it nears the two interior end-walls 42 of the vial 14. The middle of the vial 14 is preferably aligned with the midpoint 40 of the graduations 38 so that the bubble level 10 is operable to indicate when the longitudinal axis of the bubble level 10 is substantially horizontal, as discussed below.

During manufacturing, a liquid 50 is injected between the base 12 and the vial 14 in sufficient quantity so as to form a bubble 52. Therefore, the bubble 52 resides between the base 12, the interior end-walls 42, and the interior side-walls 44 of the vial 14. The bubble 52 is preferably large enough so as to not be able to form a true spherical shape at any point between the base 12 and the vial 14.

The liquid 50 is preferably a bright color that allows the liquid 50 is to be easily seen from a distance, such as a bright green or a bright yellow. This provides that the bubble 52 may also be easily discerned from a distance, since the bubble 52 is an absence of the liquid 50. For example, if the bubble 52 is centered with respect to the graduations 38, then the bubble 52 can be easily discerned between two portions of the liquid 50 on either side of the bubble 52.

Since the vial 14 is substantially transparent, light freely enters the two exterior sides 34 and the top exterior surface 36 of the vial 14. The light is then incident upon one of the two interior side-walls 44 of the vial 14 where the liquid 50 or the bubble 52 may be present. Light incident upon either of the interior side-walls 44 where the liquid 50 is present meets a liquid interface at the approximately forty-five degree angle of the interior side-wall 44. The liquid interface allows the light to continue through and be attenuated by the liquid 50.

However, light incident upon either of the interior side-walls 44 where the bubble 52 is present meets an air interface at the approximately forty-five degree angle of the interior side-wall 44. The air interface causes the light to reflect at an approximately ninety degree angle, as shown in FIG. 4. Therefore, light entering the top exterior surface 36 will be reflected off one of the interior side-walls 44 adjacent the bubble 52 and out one of the exterior sides 34 of the vial 14.

Additionally, when light is incident upon either one of the exterior sides 34 or the top exterior surface 36 of the vial 14, from within the vial 14, a portion of the light is reflected. This is because the light meets another air interface and is reflected, much as the light is reflected by either of the interior side-walls 44 adjacent the bubble 52. Thus, when light enters one of the exterior sides 34 of the vial 14 and becomes incident upon one of the interior side-walls 44, it is reflected toward the top exterior surface 36 of the vial 14. When the light is incident upon the top exterior surface 36, from within the vial 14, a portion of the light is reflected back toward the interior side-wall 44. The light is again reflected off the interior side-wall 44 toward the exterior side 34 of the vial 14.

These air interfaces allow a user to look into one of the exterior sides 34 of the vial 14 and align the bubble 52 with the midpoint 40 of the graduations 38 on the top exterior surface 36 of the vial 14. Thus, the user may view the position of the bubble 52 with respect to the graduations 38, by looking at either of the exterior sides 34 or the top exterior surface 36 of the vial 14. Additionally, the user may view the bubble 52 within the bubble level 10 from across a room, since light can be gathered and reflected toward the user. For example, if one of the exterior sides 34 is aligned upwardly, then light entering the exterior side 34 may be reflected out the top exterior surface 36 to the user who may be standing across the room from the bubble level 10.

As is well known in the art, bubbles comprised of any gas will seek a highest point, when suspended in any liquid that is heavier than the gas. This is due to the fact the gravity acts upon the liquid 50, pulling the liquid downward and forcing the bubble 52 upward. Additionally, as is well known in the art, any liquid exhibits a characteristic known as surface tension. Surface tension provides a wall tension that allows for the formation of bubbles. The tendency to minimize the wall tension pulls the bubbles into spherical shapes. These principals are combined and exploited by the present invention.

As can be seen in FIG. 1, when the longitudinal axis of the bubble level 10 is substantially horizontal, the bubble 52 will be substantially centered with respect to the graduations 38 and thereby indicate that the bubble level 10 is level. As will be discussed below, this is true without regard to how the bubble level 10 is rotated about the longitudinal axis.

For example, when the bubble level 10 is rotated so that the top exterior surface 36 is aligned upwardly, the bubble 52 is centered due to the fact that the middle of the apex 46 is closest to the top exterior surface 36 of the vial, as discussed above. Therefore, the highest point is directly under the midpoint 40 of the graduations 38.

As another example, when the bubble level 10 is rotated so that either one of the exterior sides 34 is aligned upwardly, the bubble 52 is centered due to the fact that the interior side-walls 44 are bowed outwardly, as discussed above. Therefore, the highest point is where a middle of the interior side-wall 44 meets the base 12 adjacent to the channel 24. The middle of the interior side-wall 44 is also aligned with the graduations 38, such that the bubble 52 is centered adjacent the midpoint 40 of the graduations 38.

As a final example, when the bubble level 10 is rotated so that the top exterior surface 36 is aligned downwardly, the bubble 52 is centered due to the effect of surface tension acting upon the bubble 52 and against the interior side-walls 44. As discussed above, the top surface 20 of the base 12 is preferably substantially flat. Therefore, in this case, there is no highest point on the top surface 20 of the base 12. Since the middle of the apex 46 is closest to the top exterior surface 36, which is now aligned downwardly, the middle of the apex 46 is now a lowest point in the vial 14. Therefore, the middle of the apex 46 is also farthest from the base 12. Thus, the middle of the apex 46, which is also aligned with the midpoint 40 of the graduations 38, provides a maximum cross-sectional area between the base 12 and the vial 14. The maximum cross-sectional area allows the bubble 52 to most closely achieve the spherical shape, which is the shape the surface tension of the liquid 50 inherently tries to achieve, as discussed above.

Therefore, by constricting the area between the base 12 and the vial 14 such that the bubble 52 cannot achieve the spherical shape, the surface tension of the liquid 50 will center the bubble 52 with respect to the graduations 38. This is due to the fact that the bubble 52 is able to most closely achieve the spherical shape only when the bubble 52 is centered with respect to the middle of the apex 46, which is centered with respect to the midpoint 40 of the graduations 38. Thus, the surface tension of the liquid 50 causes the bubble 52 to indicate that the bubble level 10 is level, when there is no highest point for the bubble 52 to seek.

The operation of the bubble level 10 has been described as the bubble level 10 is rotated about a substantially horizontal longitudinal axis, in approximately ninety degree increments. As should be apparent, when the bubble level 10 is rotated to a point between one of the above described examples, a combination of the above principals will act to center the bubble 52. This, of course, is provided that the longitudinal axis of the bubble level 10 is held substantially horizontal.

Alternatively, when the longitudinal axis of the bubble level 10 is not substantially horizontal, the bubble 52 will not be substantially centered with respect to the graduations 38. This is due to the fact that the highest point is located other than adjacent the midpoint 40 of the graduations 38 without regard to how the bubble level 10 is rotated about the longitudinal axis. The degree to which the longitudinal axis is not horizontal can be indicated by the bubble 52 and the graduations 38, as shown in FIG. 5.

It should be apparent that the forces involved with the bubble 52 seeking the highest point are much greater than the forces involved with the surface tension of the liquid 50. Therefore, the surface tension is not able to center the bubble 52 when there is a highest point between the base 12 and the vial 12. For example, when the top exterior surface 36 of the vial 14 is aligned downwardly and the longitudinal axis of the bubble level 10 is not horizontal, there will be a highest point along the top surface 20 near one of the ends 16 of the base 12, even though the top surface 20 of the base 12 is substantially flat.

It should further be apparent that the apex 46 is characterized by a curvature that is defined by the interior side-walls 44 and a degree to which the interior side-walls 44 are outwardly bowed. Additionally, the curvature of the apex 46 and the degree to which the interior side-walls 44 are outwardly bowed controls a sensitivity of the bubble level 10. In other words, by changing the degree to which the interior side-walls 44 are outwardly bowed, the curvature of the apex 46 is also changed, as is the sensitivity of the bubble level 10. For example, if the degree to which the interior side-walls 44 are outwardly bowed is changed to a smaller radius of curvature, then the curvature of the apex 46 is similarly reduced. An effect would be to reduce the sensitivity of the bubble level 10. Alternatively, increasing the degree to which the interior side-walls 44 are outwardly bowed would increase the curvature of the apex 46 and the sensitivity of the bubble level 10.

While the present invention has been described above, it is understood that other materials and/or dimensions can be substituted. For example, the liquid 50 may be substantially transparent. Additionally, the bubble level 10 may be longer or shorter than described above. For example, the base 12 may be six inches long, with corresponding dimensions for the rest of the bubble level 10.

Additionally, the base 12 may be different than that described above. It should be apparent that many objects may be able to form the base 12. For example, the vial 14 may be mounted to a ruler, with the ruler forming the base 12. Alternatively, the vial 14 may be mounted to a picture frame, with at least a portion of the picture frame forming the base 12.

Furthermore, the bubble level 10 may be constructed using two vials 14 back to back, with or without the base 12. In this case, the liquid 50 may be contained between the vials 14. Such a design would allow the user to rotate the bubble level at any angle about the substantially horizontal longitudinal axis and view the bubble 52 from any angle. Depending upon the angle at which the user views the bubble 52, one of the vials 14 may provide the functionality of and otherwise form the base 12. These and other minor modifications are within the scope of the present invention.

The present invention has been described with the bubble level 10 being designed to indicate when its longitudinal axis is substantially horizontal. It may be advantageous for the bubble level 10 of the present invention to be designed to indicate some other orientation of the longitudinal axis. For example, the bubble level 10 of the present invention may be designed to indicate when the longitudinal axis is approximately ten degrees from the horizontal. In this case, the base 12 may incorporate a ten degree difference in its thickness. Alternatively, the alignment of the interior side-walls 44 of the vial may be modified, in order to accommodate a different orientation. Finally, the graduations 38 may simply be moved so as not to be centered with respect to the top exterior surface 36 of the vial 14. Any of these modifications would allow the bubble level 10 to be designed to indicate an orientation other than a horizontal longitudinal axis.

In use, the user affixes the bubble level 10 to the object to be leveled, using fasteners driven through the holes 22. Alternatively, the user may choose to affix the bubble level 10 to the object using an adhesive, may simply hold the bubble level 10 against the object, or may place the bubble level 10 on top of the object, letting gravity hold the bubble level 10 in place. Then, the user looks into the vial 14 from either of the exterior sides 34 or the top exterior surface 36 of the vial 14 and moves the object to center the bubble 52 with respect to the midpoint 40 of the graduations 38. Regardless of whether the user looks into the vial 14 from either of the exterior sides 34 or the top exterior surface 36, the user can seen the graduations 38 using the reflective properties of the vial 14, as described above.

Having thus described a preferred embodiment of the invention, what is claimed as new and desired to be protected by letters patent includes the following:

What is claimed is:

1. A bubble level vial operable to mate with a base in order to contain liquid, the vial comprising:

a substantially flat exterior surface offset from the base;

a first arcuate interior side-wall arranged at an approximately 45 degree angle to the exterior surface; and a second arcuate interior side-wall arranged at an approximately 45 degree angle to the exterior surface and an approximately 90 degree angle to the first side-wall, wherein the side-walls are bowed outwardly with respect to one another.

2. The vial as set forth in claim 1, wherein the side-walls meet to form an apex substantially centered with respect to the exterior surface.

3. The vial as set forth in claim 2, wherein the apex is arcuate such that the apex is closest to the exterior surface at a middle of the apex and furthest away from the exterior surface at both ends of the apex.

4. The vial as set forth in claim 1, wherein the liquid is substantially opaque and attenuates light passing therethrough.

5. The vial as set forth in claim 1, wherein a bubble is formed in the liquid which allows light to reflect from the side-walls adjacent the bubble.

6. The vial as set forth in claim 5, further including graduations on the exterior surface that can be seen from a side of the vial when light reflects off one of the side-walls adjacent the bubble.

7. The vial as set forth in claim 6, wherein the graduations include indicia indicative of a midpoint of the gradations.

8. The vial as set forth in claim 7, wherein the midpoint in aligned such that the bubble is adjacent the midpoint when a longitudinal axis is substantially horizontal.

9. The vial as set forth in claim 7, wherein the midpoint in aligned such that the bubble is adjacent the midpoint when a longitudinal axis is offset from the horizontal by up to ten degrees.

10. The vial as set forth in claim 1, wherein the vial is sealed to a base with a surface that is substantially flat with respect to a longitudinal axis of the vial.

11. The vial as set forth in claim 10, further including a space having a substantially triangularly shaped cross-sectional area between the base and the vial.

12. The vial as set forth in claim 11, wherein the space is constrained such that a bubble in the liquid is not able to form a sphere.

13. The vial as set forth in claim 10, further including a space between the base and the vial having a cross-sectional area with at least two substantially flat sides.

14. A bubble level comprising:
a base;
a vial sealed to the base with a space therebetween, wherein the vial includes
   a substantially flat exterior surface,
   a first arcuate interior side-wall arranged at an approximately 45 degree angle to the exterior surface, and
   a second arcuate interior side-wall arranged at an approximately 45 degree angle to the exterior surface and an approximately 90 degree angle to the first side-wall, wherein the side-walls are bowed outwardly with respect to one another;
a liquid contained between the base and the vial;
a bubble in the liquid.

15. The vial as set forth in claim 14, wherein the side-walls meet to form an arcuate apex substantially centered with respect to the exterior surface and closest to the exterior surface at a middle of the apex.

16. The vial as set forth in claim 14, wherein the bubble allows light to reflect from the side-walls adjacent the bubble with minimum attenuation.

17. The vial as set forth in claim 14, wherein the exterior surface of the vial includes graduations that can be seen from a side of the vial when light reflects off one of the side-walls adjacent the bubble.

18. The vial as set forth in claim 14, wherein a space between the base and the vial has a substantially triangularly shaped cross-sectional area and is constrained such that the bubble is not able to form a sphere.

19. The vial as set forth in claim 14, wherein a space between the base and the vial has a cross-sectional area with at least two substantially flat sides and is constrained such that the bubble is not able to form a sphere.

20. A bubble level operable to indicate when a longitudinal axis of the level is substantially horizontal, the level comprising:

a base with a substantially flat surface with respect to the longitudinal axis;
a vial sealed to the base and including
   substantially flat exterior surface with graduations and indicia representative of a midpoint of the graduations,
   a first arcuate interior side-wall arranged at an approximately 45 degree angle to the exterior surface, and
   a second arcuate interior side-wall arranged at an approximately 45 degree angle to the exterior surface and an approximately 90 degree angle to the first side-wall, wherein the side-walls are bowed outwardly with respect to one another and meet to form an arcuate apex substantially centered with respect to the exterior surface and closest to the exterior surface at a middle of the apex;
a space having a cross-sectional area between the vial and the base;
a substantially opaque liquid disposed within the space; and
a bubble of sufficient size so as to form a sphere with a larger circular cross-sectional area than the cross-sectional area of the space and disposed within the space, wherein the bubble allows light to reflect from the side-walls adjacent the bubble so that the graduations may be seen from a side of the vial when light reflects off one of the side-walls adjacent the bubble.

21. A bubble level vial operable to contain liquid, the vial comprising:
a substantially flat exterior surface;
a first arcuate interior side-wall arranged at an approximately 45 degree angle to the exterior surface; and
a second arcuate interior side-wall arranged at an approximately 45 degree angle to the exterior surface and an approximately 90 degree angle to the first side-wall, wherein the side-walls are bowed outwardly with respect to one another and meet to form an arcuate apex substantially centered with respect to the exterior surface such that the apex is closest to the exterior surface at a middle of the apex and furthest away from the exterior surface at both ends of the apex.

22. A bubble level vial operable to contain liquid, the vial comprising:
a substantially flat exterior surface including graduations;
a first arcuate interior side-wall arranged at an approximately 45 degree angle to the exterior surface;
a second arcuate interior side-wall arranged at an approximately 45 degree angle to the exterior surface and an approximately 90 degree angle to the first side-wall, wherein the side-walls are bowed outwardly with respect to one another; and
wherein a bubble is formed in the liquid which allows light to reflect from the side-walls adjacent the bubble such that the graduations can be seen from a side of the vial when light reflects off one of the side-walls adjacent the bubble.

* * * * *